United States Patent
Shah et al.

(10) Patent No.: US 9,633,046 B2
(45) Date of Patent: Apr. 25, 2017

(54) AUTOMATED IMAGE CROPPING AND SHARING

(71) Applicant: INTEL CORPORATION, Santa Clara, CA (US)

(72) Inventors: Shibani Shah, San Jose, CA (US); Marci Meingast, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,651

(22) PCT Filed: Sep. 18, 2013

(86) PCT No.: PCT/US2013/060340
§ 371 (c)(1),
(2) Date: Dec. 27, 2013

(87) PCT Pub. No.: WO2015/041641
PCT Pub. Date: Mar. 26, 2015

(65) Prior Publication Data
US 2016/0188635 A1    Jun. 30, 2016

(51) Int. Cl.
*G06F 17/30*    (2006.01)
*G06T 3/40*    (2006.01)
(Continued)

(52) U.S. Cl.
CPC .. *G06F 17/30259* (2013.01); *G06F 17/30528* (2013.01); *G06F 17/30864* (2013.01);
(Continued)

(58) Field of Classification Search
CPC ......... G06F 17/30259; G06F 17/30864; G06F 17/30528; H04N 5/225; H04N 5/2628; H04L 65/601; G06K 9/3241
See application file for complete search history.

(56) References Cited

U.S. PATENT DOCUMENTS 9,070,182 B1 *  6/2015  Chua .................... G06T 3/0012
2003/0025812 A1 *  2/2003  Slatter ............... H04N 5/23293
                                        348/240.2
(Continued)

FOREIGN PATENT DOCUMENTS

JP      2004-520735 A    7/2004
JP      2013-088906 A    5/2013
(Continued)

OTHER PUBLICATIONS

International Search Report and Written Opinion received for International Application No. PCT/US2013/060340, mailed Jun. 5, 2014, 10 pages.
(Continued)

*Primary Examiner* — Jason Flohre
(74) *Attorney, Agent, or Firm* — Barnes & Thornburg LLP

(57) ABSTRACT

Technologies for automated cropping and sharing of images include an imaging device configured to capture a digital image, recognize one or more subjects represented in the image, determine the social network groups associated with the subjects of the digital image, and crop the digital image to generate one or more sub-images. Each of the sub-images includes subjects associated with a particular social network group. Each of the sub-images may be shared with the relevant social network group. Subjects may include persons, objects, or events, and may be recognized through computer vision techniques as well as using contextual data. The imaging device may receive social network data from one or more social network servers, which may be used to determine the relevant social network groups. The imaging device may also exclude subjects from the cropped sub-images based on one or more content policies. Other embodiments are described and claimed.

15 Claims, 5 Drawing Sheets

(51) Int. Cl.
*G06K 9/32* (2006.01)
*H04N 5/225* (2006.01)
*H04N 5/262* (2006.01)
*H04L 29/06* (2006.01)

(52) U.S. Cl.
CPC .............. *G06K 9/3241* (2013.01); *G06T 3/40* (2013.01); *H04L 65/601* (2013.01); *H04N 5/225* (2013.01); *H04N 5/2628* (2013.01)

(56) References Cited

U.S. PATENT DOCUMENTS

| | | | |
|---|---|---|---|
| 2005/0025387 A1* | 2/2005 | Luo ..................... | H04N 1/3875 382/298 |
| 2006/0072847 A1* | 4/2006 | Chor ................... | H04N 1/3875 382/282 |
| 2007/0076979 A1* | 4/2007 | Zhang ................. | H04N 1/3873 382/282 |
| 2010/0050090 A1 | 2/2010 | Leebow | |
| 2010/0214445 A1* | 8/2010 | Chronqvist ........ | H04N 1/00336 348/231.99 |
| 2010/0226584 A1 | 9/2010 | Weng et al. | |
| 2013/0194438 A1* | 8/2013 | Sweet, III .......... | G06K 9/00221 348/207.1 |

FOREIGN PATENT DOCUMENTS

| | | |
|---|---|---|
| KR | 10-2006-0048225 A | 5/2006 |
| KR | 1020090097691 A | 9/2009 |
| KR | 1020110042612 A | 4/2011 |
| KR | 1020120140404 A | 12/2012 |

OTHER PUBLICATIONS

Wagner et al., "Toward a Practical Face Recognition System: Robust Alignment and Illumination by Sparse Representation," 34 IEEE Transactions on Pattern Analysis and Machine Intelligence, 2012, pp. 372-386.

Fei-Fei et al., "A Bayesian Hierarchical Model for Learning Natural Scene Categories," Proc. of IEEE Computer Vision and Pattern Recognition, 2005, pp. 524-531.

Csurka et al., "Visual Categorization with Bags of Keypoints," Proc. of ECCV Int'l Workshop on Statistical Learning in Computer Vision, 2004, 16 pages.

Viola et al., "Robust Real-Time Face Detection," 57 Int'l Journal of Computer Vision, vol. 57(2), 2004, pp. 137-154.

Office Action for Korean Patent Application No. 10-2016-7003664, dated Oct. 13, 2016, 7 pages.

* cited by examiner

AUTOMATED IMAGE CROPPING AND SHARING

CROSS REFERENCE TO RELATED APPLICATIONS

This application is a national stage entry under 35 USC §371(b) of International Application No. PCT/US2013/060340, which was filed Sep. 18, 2013.

BACKGROUND

Digital images and media have growing importance in many people's lives. Images and media are used by many for communication and for self-expression. Through the use of digital images and media, a person may build emotional connections with other people, including family, friends, and the public at large.

Many people have a growing desire to share their personal experiences with other people, for example through social networking websites. In particular, many people enjoy sharing digital images on such websites. However, sharing images while at the same time maintaining personal privacy are a concern for many people. Typically a person must manually specify particular contacts or groups of contacts prior to sharing an image. Additionally, a person typically must manually crop or modify digital images prior to sharing if required to ensure privacy.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
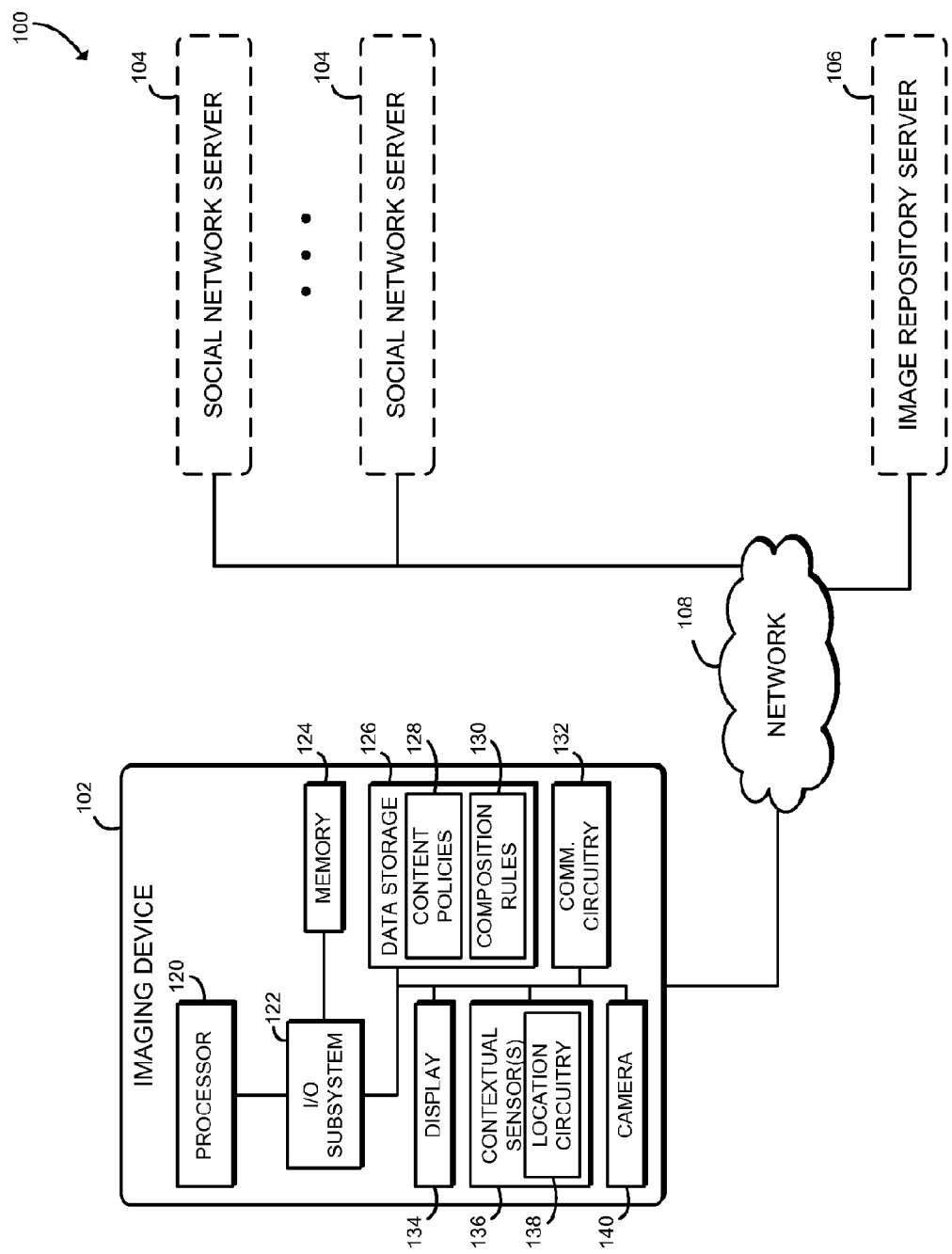
FIG. 1 is a simplified block diagram of at least one embodiment of a system for automated image cropping and sharing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for automated image cropping and sharing includes an imaging device 102 and, in some embodiments, one or more social network servers 104 and an image repository server 106. The imaging device 102, social network server 104, and image repository server 106 may be in communication with each other over a network 108. In use, as discussed in more detail below, the imaging device 102 captures a digital image and processes the digital image to detect and recognize subjects represented within the image. The subjects may include persons, objects, or events depicted in the image. The imaging device 102 associates the subjects recognized in the image with relevant social network groups of a user of the imaging device 102. A social network group may be embodied as a collection of contacts generated from the user's social network data (e.g., contacts on a social network site or in the user's contact list). The social network data may be stored locally on the imaging device 102 or on one or more social network servers 104. After associating social network groups, the imaging device 102 generates a sub-image for each relevant social network group, cropping the image to include related subjects and exclude unrelated subjects. The imaging device 102 uses one or more composition rules to generate aesthetically pleasing sub-images in an automated manner. After the sub-images have been generated, the imaging device 102 shares the sub-images with the relevant social network groups. For example, the imaging device 102 may transmit the sub-images to the social network server(s) 104 or the image repository server 106 to share the sub-images.

Automated image cropping and sharing thus allows image sharing without tedious, manual cropping and categorization. Accordingly, the user may share more images with more recipients. Additionally, users may be more confident about sharing images because automated image sharing helps to confine shared images to appropriate audiences, in particular preventing sharing of objectionable content and thereby preserving privacy in some cases.

The imaging device 102 is may be embodied as any type of device capable of performing the functions described herein, including, without limitation, a digital camera, a smartphone, a cellular telephone, a handset, a computer, a tablet computer, a laptop computer, a notebook computer, a messaging device, a vehicle telematics device, a network appliance, a web appliance, a distributed computing system, a multiprocessor system, a processor-based system, and/or a consumer electronic device. As shown in FIG. 1, the imaging device 102 includes a processor 120, an input/output subsystem 122, a memory 124, a data storage device 126, and communication circuitry 132. Of course, the imaging device 102 may include other or additional components, such as those commonly found in a mobile imaging device (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the imaging device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the imaging device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the imaging device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store one or more content policies 128 used to identify potentially objectionable content, as well as one or more composition rules 130 used for automated image cropping.

The communication circuitry 132 of the imaging device 102 may be embodied as any communication circuit, device, or collection thereof, capable of enabling communications between the imaging device 102, the social network server(s) 104, the image repository server 106, and/or other remote devices over the network 108. The communication circuitry 132 may be configured to use any one or more communication technology (e.g., wireless or wired communications) and associated protocols (e.g., Ethernet, Bluetooth®, Wi-Fi®, WiMAX, etc.) to effect such communication.

In the illustrative embodiment, the imaging device 102 further includes a display 134, a number of contextual sensor(s) 136, and a camera 140. The display 134 of the imaging device 102 may be embodied as any type of display capable of displaying digital information such as a liquid crystal display (LCD), a light emitting diode (LED), a plasma display, a cathode ray tube (CRT), or other type of display device. In some embodiments, the display 134 may be coupled to a touch screen to allow user interaction with the imaging device 102.

The contextual sensor(s) 136 may be embodied as any type of sensor(s) capable of generating digital data indicative of the context of the imaging device 102 and/or the user of the imaging device 102. For example, in the illustrative embodiment, the contextual sensors 136 include location circuitry 138. The location circuitry 138 may be embodied as any type of sensor or circuitry capable of determining the precise or approximate location of the imaging device 102. For example, the location circuitry 138 may be embodied as a global positioning system ("GPS") receiver capable of determining the precise coordinates of the imaging device 102. In other embodiments, the location circuitry 138 may use trilateration and/or triangulation to determine the position of the imaging device 102 using distances and/or angles to cellular network towers, or other structures, with known positions, provided by the communication circuitry 132. In other embodiments, the location circuitry 138 may determine the approximate position of the imaging device 102 based on association to wireless networks and/or access points with known positions, using the communication circuitry 132.

The camera 140 may be embodied as a digital camera or other digital imaging device integrated with the imaging device 102 or otherwise communicatively coupled thereto. The camera 140 may include an electronic image sensor, such as an active-pixel sensor (APS), e.g., a complementary metal-oxide-semiconductor (CMOS) sensor, or a charge-coupled device (CCD). The camera 140 may be capable of capturing still images and/or video. In some embodiments, the camera 140 may be capable of capturing three-dimensional depth imaging describing a scene, for example using a depth camera, a stereoscopic camera, a structured light sensor, a rangefinder, a light field sensor, or any other sensor capable of capturing depth information.

Each of the social network servers 104 is configured to store and allow retrieval of social network data of the user of the imaging device 102. Each social network server 104 may be embodied as any type of server computing device, or collection of devices, capable of performing the functions described herein. As such, each social network server 104 may be embodied as a single server computing device or a collection of servers and associated devices. For example, in some embodiments, each social network server 104 may be embodied as a "virtual server" formed from multiple computing devices distributed across the network 108 and operating in a public or private cloud. Accordingly, although the social network server(s) 104 are illustrated in FIG. 1 as embodied as a single server computing device, it should be appreciated that each social network server 104 may be embodied as multiple devices cooperating together to facilitate the functionality described below. Further, each social network server 104 may include components and features similar to the imaging device 102 and/or typical data servers such as a processor, I/O subsystem, memory, data storage, communication circuitry, and various peripheral devices, which are not illustrated in FIG. 1 for clarity of the present description.

The image repository server 106 is configured to store and allow sharing of cropped images produced by the imaging device 102. The image repository server 106 may be embodied as any type of server computing device, or collection of devices, capable of performing the functions described herein. As such, similar to the social network servers 104, the image repository server 106 may be embodied as a single server computing device or a collection of servers and associated devices. For example, in some embodiments, the image repository server 106 may be embodied as a "virtual server" formed from multiple computing devices distributed across the network 108 and operating in a public or private cloud. Accordingly, although the image repository server 106 is illustrated in FIG. 1 as embodied as a single server computing device, it should be appreciated that the image repository server 106 may be embodied as multiple devices cooperating together to facilitate the functionality described below. Further, the image repository server 106 may include components and features similar to the imaging device 102 and/or the social network server(s) 104, such as a processor, I/O subsystem, memory, data storage, communication circuitry, and various peripheral devices, which are not illustrated in FIG. 1 for clarity of the present description. Additionally or alternatively, in some embodiments the image repository server 106 or the functionality of the image repository server 106 may be incorporated in one or more of the social network server(s) 104.

As discussed in more detail below, the imaging device 102, the social network server(s) 104, and the image repository server 106 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet. As such, the network 108 may include any number of additional devices, such as additional computers, routers, and switches, to facilitate communications among the devices of the system 100.

Figure 2:
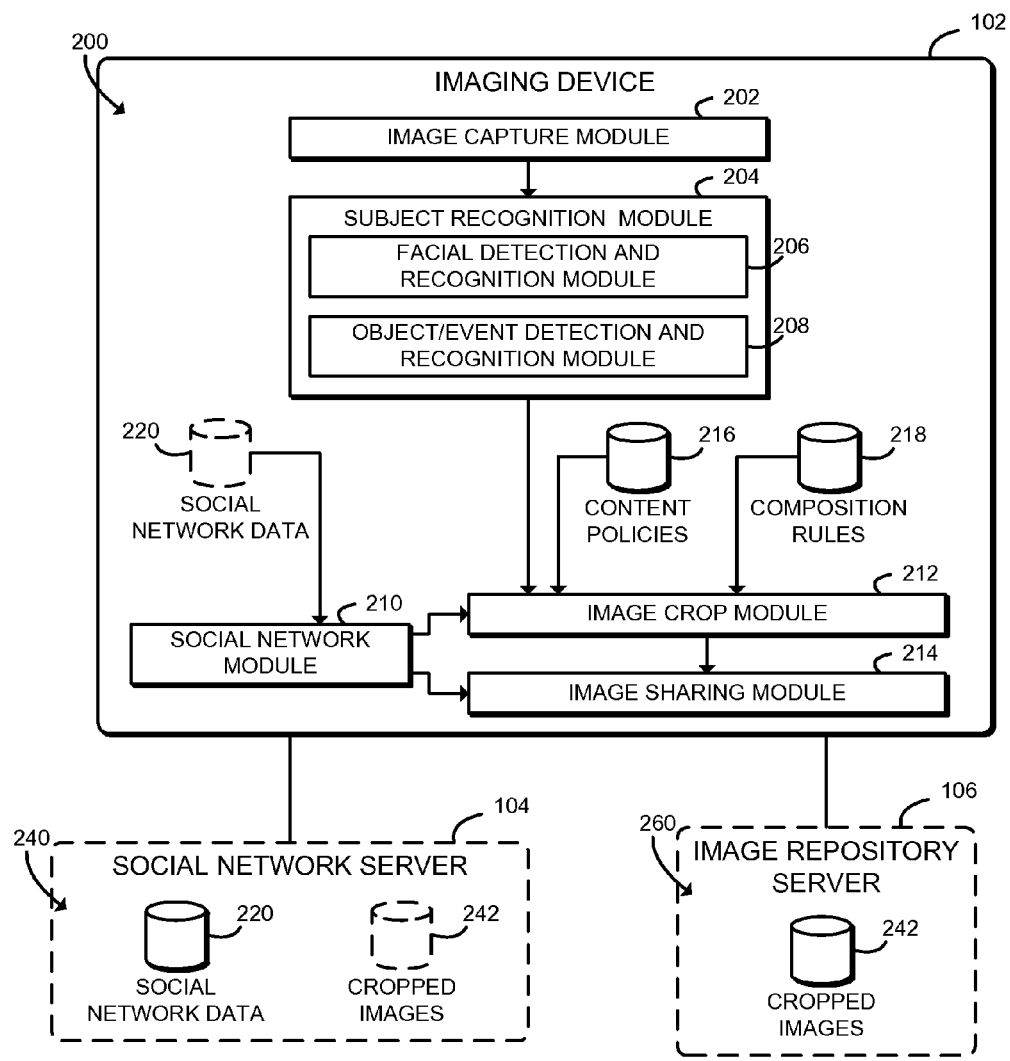
FIG. 2 is a simplified block diagram of at least one embodiment of various environments that may be established by the system of FIG. 1.

Referring now to FIG. 2, in an illustrative embodiment, the imaging device 102 establishes an environment 200 during operation. The illustrative environment 200 includes an image capture module 202, a subject recognition module 204, a social network module 210, an image crop module 212, and an image sharing module 214. The environment 200 further includes content policies 216, composition rules 218, and in some embodiments, social network data 220. The various modules of the environment 200 may be embodied as hardware, firmware, software, or a combination thereof.

The image capture module 202 is configured to capture digital images at the direction of the user. The image capture module 202 may capture images directly using image capture hardware such as the camera 140. Additionally or alternatively, the image capture module 202 may capture images by receiving the images from an external device such as a separate, dedicated digital camera, a network file server, or other image source. In such embodiments, the image capture module 202 may allow selection of an image for capture, for example using a user interface displayed on the display 134.

The subject recognition module 204 is configured to detect and recognize subjects such as persons, objects, or events represented in the digital image data. Subjects may be recognized using computer vision techniques such as facial recognition algorithms or object recognition and categorization algorithms, as described further below. In some embodiments, those functions may be performed by sub-modules, for example by a facial detection and recognition module 206 or an object/event detection and recognition module 208.

The social network module 210 is configured to associate social network groups with subjects recognized in the digital image. For example, the social network module 210 may associate recognized persons with the social network groups of which they are a member. The social network module 210 may also associate objects or events with groups related to that object/event or class of object/event. The social network groups may be defined in the social network data 220, as described below.

The image crop module 212 is configured to generate sub-images based on the captured digital image for the relevant social network groups, as discussed in more detail below. For example, for each relevant social network group, the image crop module 212 generates crop inclusion targets and crop exclusion targets listing the subjects to include and exclude from the corresponding sub-image, respectively. The image crop module 212 may reference the content policies 216 to identify subjects for exclusion from the sub-image, for example, to identify potentially objectionable or offensive objects or events for each social network group. When generating the sub-images, the image crop module 212 applies one or more composition rules 218 to control the appearance of the generated sub-image.

The social network data 220 may include any data describing or categorizing the social contacts of the user of the imaging device 102. The social network data 220 organizes the contacts of the user into a collection of social network groups. The social network groups may be defined by the user, for example by grouping contacts into groups such as friends, families, colleagues, or other groups. In some embodiments, the social network groups may be determined based on relationships between contacts stored in the social network data 220. Additionally, the social network data 220 may define associations between social network groups and various objects or events. For example, a social network group may include contacts having an affinity for a particular object or event, such as sports fans, automobile enthusiasts, theater patrons, and other similar associations. In some embodiments, the social network data 220 may be embodied as a directed graph, with nodes representing particular contacts, objects, events, or social network groups, and with edges representing the relationships between the nodes. Additionally or alternatively, the social network data 220 may be embodied as a database or flat list of contact information such as a contact list, address book, or similar data structure. The social network data 220 may be stored locally by the imaging device 102, or may be stored on one or more remote social network servers 104.

The content policies 216 include a set of rules defining whether to include or exclude recognized subjects from cropped sub-images based on the associated social network groups. For example, the content policies 216 may include a set of objectionable, offensive, irrelevant, or otherwise undesirable objects or events for each social network group. Thus, the image crop module 212 may automatically filter inappropriate content from sub-images based on the audience of the sub-image. The content policies 216 may be configurable by the user of the imaging device 102 and/or learned or otherwise updated over time.

The composition rules 218 may be embodied as a set of rules or policies describing aesthetically pleasing image compositions. Each composition rule 218 may include rules or policies describing appropriate positioning of subjects within the generated sub-image, appropriate image resolution and aspect ratios, appropriate sizes and numbers of subjects within the sub-image, and/or other aspects of the composition of the generated sub-images. As discussed in more detail below, the image crop module 212 may query the composition rules 218 to determine which of the composition rules 218 would successfully generate an acceptable sub-image when applied to a particular digital image. The composition rules 218 may be applied in a predetermined order of priority or as specified by the user of the imaging device 102. The composition rules 218 may be based on traditional photographic techniques including, for example, the rule of thirds and portraiture composition rules. The composition rules 218 may also include a fallback rule when other composition rules 218 are not capable of generating an acceptable sub-image.

Still referring to FIG. 2, the imaging device 102 may communicate with one or more social network servers 104, which each may establish an environment 240 during operation. The illustrative environment 240 includes the social network data 220 and may include cropped images data 242. The social network data 220 is configured to perform the same functions as described above. The cropped images data 242 is configured to store the cropped sub-images generated by and received from the imaging device 102. The cropped images data 242 limits access to the sub-images to members of the appropriate social network groups. The various modules of the environment 240 may be embodied as hardware, firmware, software, or a combination thereof.

Additionally, the imaging device 102 may communicate with an image repository server 106, which may establish an environment 260 during operation. The illustrative environment 260 includes the cropped images data 242, which is configured to perform the same functions as described above. The various modules of the environment 260 may be embodied as hardware, firmware, software, or a combination thereof.

Figure 3:
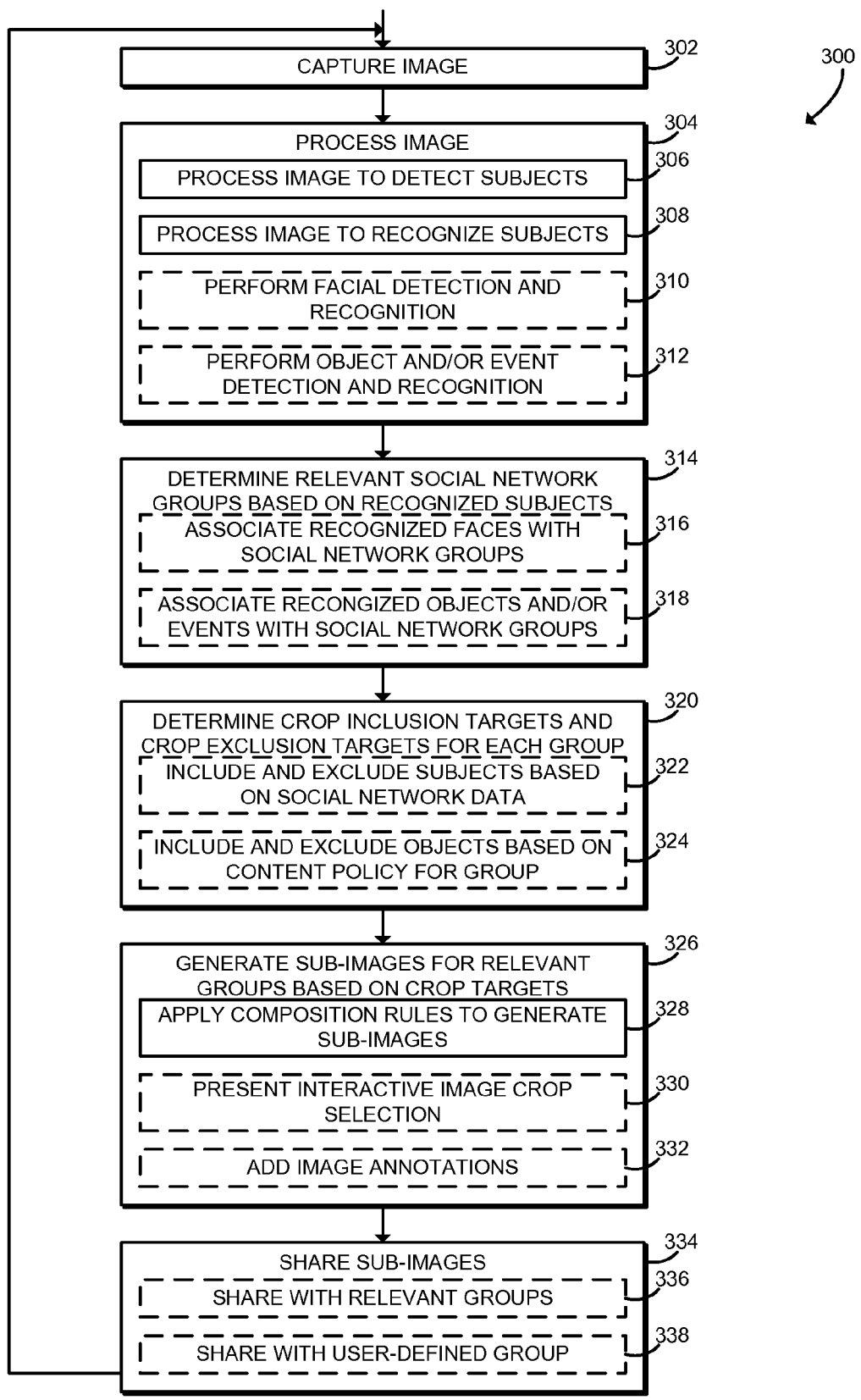
FIG. 3 is a simplified flow diagram of at least one embodiment of a method for automated image cropping and sharing that may be executed by an imaging device of the system of FIGS. 1 and 2.

Referring now to FIG. 3, in use, the imaging device 102 may execute a method 300 for automated image cropping and sharing. The method 300 begins with block 302, in which the imaging device 102 captures a digital image. The imaging device 102 may capture a new image using the camera 140, or the imaging device 102 may select an existing image. The existing image may have been previously captured by the imaging device 102 using the camera 140, or may have been received from another device, such as a separate digital camera.

In block 304, the imaging device 102 processes the digital image. For example, in block 306, the imaging device 102 processes the digital image to detect subjects represented in the digital image. The detected subjects may include any feature represented by the digital image that may provide a basis for organizing or sharing, such as human faces, persons, objects, or events. Detection of the subjects includes determining the presence of the subject in the digital image as well as determining the relative location of the subject in the digital image. The location of the subject may be described by a bounding box, the smallest rectangular region of the digital image containing the detected subject. In block 308, the imaging device 102 processes the digital image to recognize the detected subjects. The subjects may be recognized by associating identifying information with the particular subject. For example, detected persons may be recognized by determining identifying information such as name or social network profile. Detected objects or events may be recognized by categorizing, labeling, or otherwise associating semantic information with the detected subject (e.g., the shape of the object). The imaging device 102 may perform any known algorithm to detect and/or recognize subjects within the digital image. In some embodiments, the imaging device 102 may use additional data beyond the digital image data to detect and/or recognize subjects. For example, the imaging device 102 may use context data received from the contextual sensor(s) 136 or three-dimensional depth data received from a depth camera.

In block 310, in some embodiments the imaging device 102 may perform facial detection and recognition to detect and recognize subjects represented the digital image. Any known machine learning technique for facial detection and recognition may be used, such as rapid detection from a boosted cascade of simple features. Example facial detection and recognition algorithms are described in Paul Viola & Michael J. Jones, *Robust Real-Time Face Detection*, 57 Int'l J. Comp. Vision 137 (2004); Andrew Wagner et al., *Towards a Practical Face Recognition System: Robust Alignment and Illumination by Sparse Representation*, 34 IEEE Transactions on Pattern Analysis & Machine Intelligence 372 (2012). Recognized faces may be associated with particular persons or profiles described in the social network data 220.

In block 312, in some embodiments, the imaging device 102 may perform object and/or event recognition and/or detection. Any known machine learning technique for detecting, classifying, or identifying objects and events may be used. For example, objects and events can be detected and recognized using algorithms based on a bag of words of features and statistical techniques including, for example, Naïve Bayes, Latent Dirichlet Allocation, and Boosting on a feature hierarchy, as described in Gabriella Csurka et al., *Visual Categorization with Bags of Keypoints*, Proc. of ECCV Int'l Workshop on Statistical Learning in Computer Vision (2004); Li Fei-Fei & Pietro Perona, *A Bayesian Hierarchial Model for Learning Natural Scene Categories*, Proc. of IEEE Computer Vision & Pattern Recognition 524 (2005). The imaging device 102 may also use additional contextual data generated by the contextual sensors 136 or by applications of the imaging device 102 to recognize objects or events depicted in the image. For example, consider that the image depicts objects that are recognized as being associated with "sports" or "baseball," such as a field, a stadium, a baseball player, etc. The imaging device 102 may use location information generated by the location circuitry 138 to determine the identity of the particular stadium represented in the image. The imaging device 102 may use ticketing, payment, or scheduling information to determine the particular sporting event or sporting teams represented in the image. That contextual information may be generated by an application executing on the imaging device 102, such as a calendar application, a ticketing application, or a mobile payment application.

Figure 5:
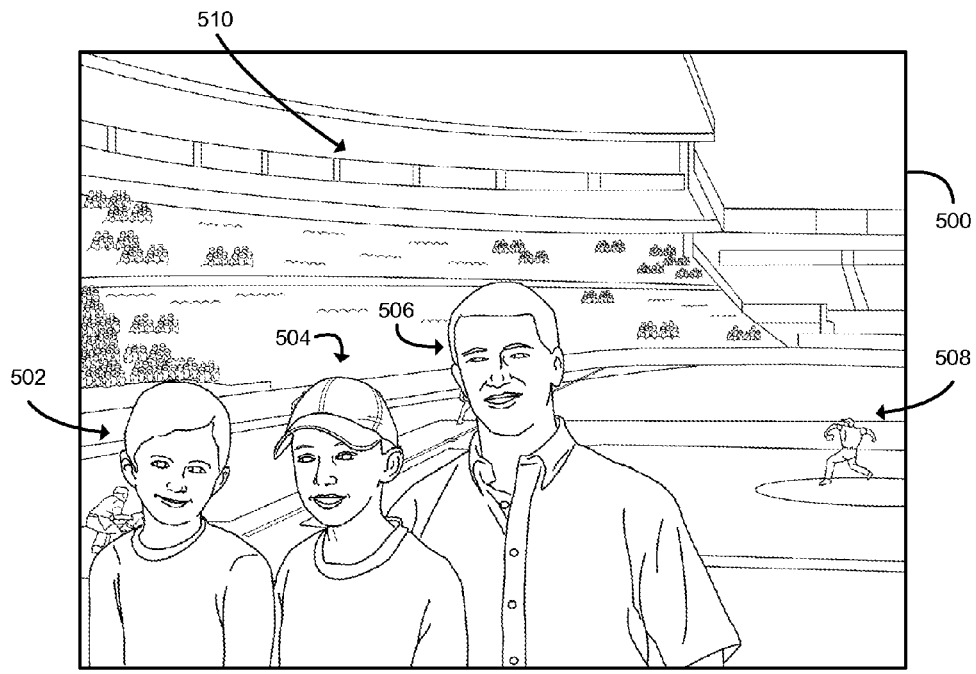
FIG. 5 is an illustration of an image that may be captured by the imaging device of FIGS. 1 and 2.

Referring now to FIG. 5, an example digital image 500 is illustrated including several recognized subjects. The image 500 includes three recognized faces 502, 504, 506. The face 502 has been recognized as a friend of the user, the face 504 has been recognized as the user, and the face 506 has been recognized as the father of the user. The image 500 also includes two recognized objects and/or events 508, 510. The object 508 has been recognized as a baseball player. The event 510 has been recognized as a baseball game. Of course, the baseball player 508 is also a person and in some embodiments the face of the baseball player 508 may also be a recognized subject.

Referring back to FIG. 3, in block 314, the imaging device 102 associates relevant social network groups to the digital image, based on the recognized subjects. As described above, the social network data 220 describes the relationships between persons known to the user. Those relationships may include groupings of persons, for example family and friends of the user. The social network data 220 may also describe attributes or interests of persons or groups of persons. The imaging device 102 determines relevant social network groups based on the subjects recognized in the image. As described above, the imaging device 102 may receive the social network data 220 from one or more social network servers 104.

In block 316, in some embodiments the imaging device 102 associates faces recognized in the image with social network groups. The imaging device 102 may determine a social network profile associated with each recognized face and in turn associate all social network groups for that social network profile to the recognized face. Those groupings may be predefined by the user, or may be determined by the imaging device 102 based on the social network data 220. For example, the imaging device 102 may determine a group of persons with a direct relationship to each subject represented in the digital image, based on relationships described in the social network data 220. In other words, the imaging device 102 may determine all persons within the user's social network having a relationship with a subject of the digital image. For example, referring again to FIG. 5, the imaging device 102 may associate the recognized friend 502 and the user 504 with a "friends" social network group of the social network data 220. The imaging device 102 may further associate the recognized user 504 and the father 506 with a "family" social network group of the social network data 220.

Referring back to FIG. 3, in block 318, in some embodiments the imaging device 102 may associate recognized objects and/or events with social network groups. As described above, the social network data 220 may associate objects, interests, locations, or other semantic information with the social network groups. For example, referring to FIG. 5, the imaging device 102 may associate the baseball player 508 and the baseball game 510 with one or more social network group associated with baseball. In some embodiments, the imaging device 102 may associate the objects and events 508, 510 with several social network groups at different levels of specificity: for example, a general sports group, a more-specific baseball group, and a highly specific fan group for a particular team of the baseball game 510.

Referring back to FIG. 3, in block 320, the imaging device 102 determines crop inclusion targets and crop exclusion targets for each social network group identified as being associated with the image. The crop inclusion and exclusion targets define the particular subjects recognized in the image that will be included in or excluded from each sub-image based on the associated social network group. In block 322, in some embodiments the imaging device 102 includes and excludes subjects based on the social network data 220. For example, the imaging device 102 may include recognized persons from the same social network group and exclude persons not in the same social network group. Additionally or alternatively, the imaging device 102 may include objects or events associated with a particular social network group and exclude all prominent faces in the image.

Figure 6A:
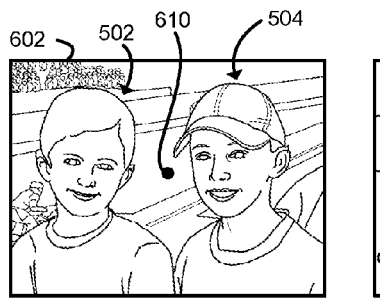
FIGS. 6A-6C are illustrations of sub-images that may be generated by the imaging device of FIGS. 1 and 2.
Figure 6B:
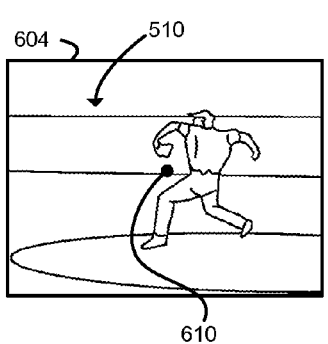

Referring now to FIG. 6A, an illustrative generated sub-image 602 of the image 500 is shown. The sub-image 602 is associated with the friends social network group described above. Accordingly, the crop inclusion targets illustratively include the friend 502 and the user 504, and the crop exclusion targets include the father 506. The objects or events 508, 510 may or may not be included in the crop exclusion targets. Referring now to FIG. 6B, another illustrative generated sub-image 604 is associated with a sports social network group as described above.

Figure 6C:
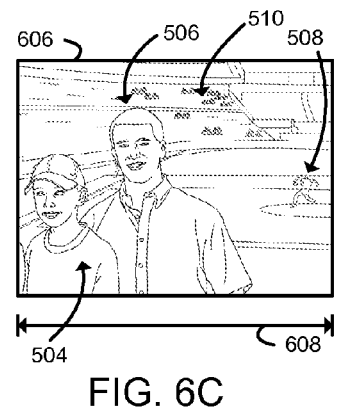

Accordingly, the crop inclusion targets for the sub-image 604 illustratively include the baseball player 508 and the baseball game 510, and the crop exclusion targets include all of the faces 502, 504, 506. Referring now to FIG. 6C, an illustrative generated sub-image 606 is associated with the family social network group described above. Accordingly, the crop inclusion targets for sub-image 606 illustratively include the user 504 and the father 506, and the crop exclusion targets include the friend 502. The objects or events 508, 510 may or may not be included in the crop inclusion targets.

Referring back to FIG. 3, in some embodiments, in block 324 the imaging device 102 may include and exclude objects based on content policies 216 associated with each social network group. The content policies 216 may define, for each social network group, objectionable content, irrelevant content, or other objects that the user does not wish to share with that social network group. For example, the content policies 216 may define that alcohol-related objects such as beer bottles should not be shared with the family social network group. In such example, the imaging device 102 may add detected beer bottles to the crop exclusion targets for sub-images associated with the family social network group.

In block 326, the imaging device 102 crops the digital image to generate sub-images for the relevant social network groups, based on the crop targets. In block 328, the imaging device 102 applies one or more of the composition rules 218 while generating the sub-images. The composition rules 218 allow the imaging device 102 to automatically generate aesthetically pleasing sub-images based on the particular subjects to be included and/or excluded from each sub-image. One embodiment of a method for applying the composition rules 218 is described further below in connection with FIG. 4.

In some embodiments, in block 330 the imaging device 102 may present interactive image crop selection. The imaging device 102 may generate one or more preview representations of the sub-image to be generated, and display the preview(s) using the display 134. The preview sub-images may be generated using one or more of the composition rules 218. The user may accept, reject, or modify a proposed cropped sub-image using a user interface of the imaging device 102. In some embodiments, in block 332 the imaging device 102 may add annotations to the generated sub-images. For example, the imaging device 102 may add textual or image labels to the generated sub-image based on the recognized subjects. In some embodiments, the image may be annotated for humorous effect, for example by adding cartoon characters, novelty statements, or the like.

In block 334, the imaging device 102 shares the generated sub-images. Sharing the generated sub-images makes the sub-images available to a particular set of persons or a particular social network group. To share the sub-images, the imaging device 102 may transmit the sub-images to one or more social network servers 104 or to an image repository server 106. The generated sub-images may be stored on the servers 104, 106 as the cropped images 242. Alternatively or additionally, the generated sub-images may be directly transmitted to the end user by the imaging device 102. For example, the imaging device 102 may transmit the generated sub-images to one or more computing devices associated with the recipients by e-mail, instant message, text message, direct file transfer, or similar technique. In some embodiments, in block 336 the imaging device 102 may share each generated sub-image with the relevant social network group. For example, the imaging device 102 may share the generated sub-image with the social network group of persons recognized in the sub-image. As another example, the imaging device 102 may share the generated sub-image with a social network group associated with the objects and/or events recognized in the sub-image. In some embodiments, in block 338 the imaging device 102 may share the generated sub-images with a user-defined group of recipients. For example, the user may select an arbitrary group of contacts with which to share a particular sub-image. After sharing the sub-images, the method 300 loops back to block 302 to capture additional images.

Figure 4:
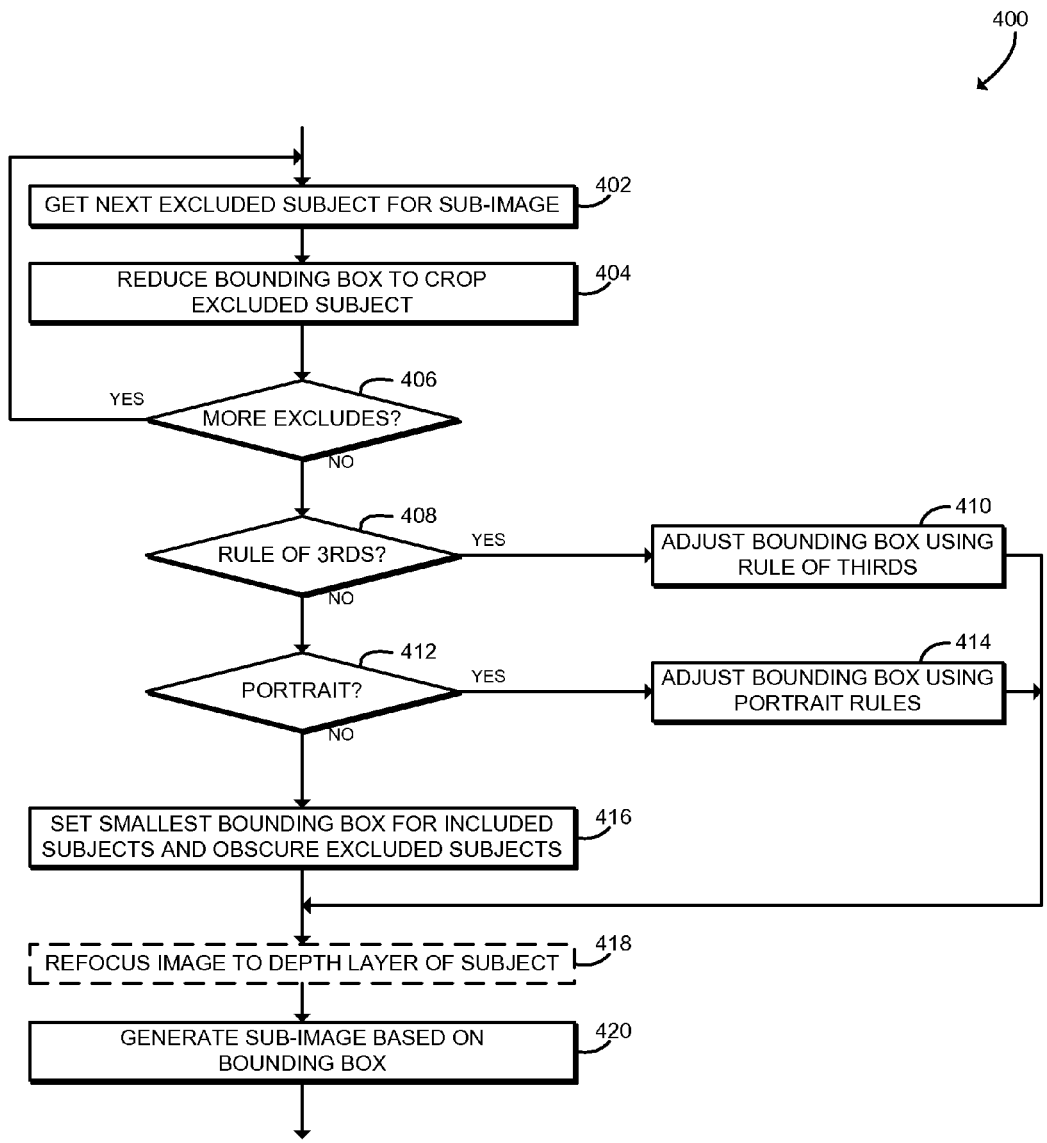
FIG. 4 is a simplified flow diagram of at least one embodiment of a method for image cropping using composition rules that may be executed by the imaging device of FIGS. 1 and 2.

Referring now to FIG. 4, in use, the imaging device 102 may execute a method 400 for generating sub-images using one or more composition rules 218. As described above, the imaging device 102 may generate a set of crop inclusion targets and a set of crop exclusions targets for each social network group relevant to the digital image. The method 400 begins in block 402, in which the imaging device 102 retrieves the next excluded subject for the sub-image from the crop exclusion targets. As described above, excluded subjects may include recognized persons who are not associated with the particular social network group, prominent faces to be excluded from a sub-image focusing on an object or event, or objects to be excluded based on the content policies 216.

In block 404, the imaging device 102 reduces the bounding box to crop the excluded subject. The bounding box is a rectangular, or other geometrically shaped, region of the digital image corresponding to the sub-image to be generated. The bounding box is initially set as the entire digital image and thus includes all of the crop inclusion targets as well as the crop exclusion targets. The bounding box is reduced in size to exclude the excluded subject while still including all of the crop inclusion targets. In some embodiments, it may not be possible to exclude the excluded subject while still including all crop inclusion targets in the bounding box; for example, a person to be excluded may be surrounded by persons to be included in the sub-image. In those embodiments, the imaging device 102 may determine that the bounding box does not exist. Additionally, in some embodiments, the imaging device 102 may utilize other methodologies for cropping or removing the excluded subject such as selected image blurring.

In block 406, the imaging device 102 determines whether additional subjects to be excluded remain in the crop exclusion targets. If additional subjects remain, the method 400 loops back to block 402 to continue adjusting the bounding box. If no additional subjects remain, the method 400 advances to block 408. Although described and illustrated as occurring sequentially, in some embodiments the exclusion list may be processed in parallel.

In block 408, the imaging device 102 determines whether a rule-of-thirds composition rule 218 matches the sub-image, that is, whether the rule-of-thirds composition rule 218 generates an acceptable sub-image based on the bounding box and the included subjects. The so-called "rule of thirds" is a well-known guideline for composing aesthetically pleasing images. According to the rule of thirds, images with the subject or subjects positioned at about one-third of the way along an image dimension tend to be aesthetically pleasing. For example, referring to FIG. 6C, illustrative sub-image 606 is composed according to the rule of thirds. The subjects 504, 506 are positioned about one-third of the way across a width 608 of the sub-image 606. Referring back to FIG. 4, the imaging device 102 may determine whether the rule of thirds composition rule 218 generates an acceptable sub-image by provisionally reducing the size of the bounding box until the rule of thirds composition rule 218 is satisfied, and then determining whether the generated sub-image has sufficient resolution, includes all of the subjects of the crop inclusion list, or other image criteria. If the bounding box does not exist, as described above, the imaging device 102 may determine that the rule of thirds composition policy does not match the sub-image. In some embodiments, the imaging device 102 may present the provisional sub-image to the user, for example using the display 134, and allow the user to determine whether the rule-of-thirds composition rule 218 generates an acceptable sub-image. If the rule-of-thirds composition rule 218 matches, the method 400 branches to block 410, in which the imaging device 102 adjusts the bounding box according to the rule-of-thirds composition rule 218. After adjusting the bounding box, the method 400 advances to block 418, described below. Referring back to block 408, if the rule-of-thirds composition rule 218 does not match, the method 400 advances to block 412.

In block 412, the imaging device 102 determines whether a portrait composition rule 218 matches the sub-image, that is, whether the portrait composition rule 218 generates an acceptable sub-image based on the bounding box and the included subjects. The portrait composition rule 218 specifies that subjects should be roughly centered in the generated sub-image. For example, referring to FIGS. 6A and 6B, illustrative sub-images 602, 604 are composed according to the portrait composition rule 218. In the sub-image 602, the faces 502, 504 are centered about a center 610 of the sub-image 602. In the sub-image 604, the baseball game 510 is positioned about the center 610 of the sub-image 604. Referring back to FIG. 4, the imaging device 102 may determine whether the portrait composition rule 218 generates an acceptable sub-image by provisionally reducing the size of the bounding box until the portrait composition rule 218 is satisfied, and then determining whether the generated sub-image has sufficient resolution, has an acceptable image aspect ratio, includes multiple subjects that are human faces, or other image criteria. If the bounding box does not exist, as described above, the imaging device 102 may determine that the portrait composition policy does not match the sub-image. In some embodiments, the imaging device 102 may present the provisional sub-image to the user, for example using the display 134, and allow the user to determine whether the portrait composition rule 218 generates an acceptable sub-image. If the portrait composition rule 218 matches, the method 400 branches to block 414, in which the imaging device 102 adjusts the bounding box according to the portrait composition rule 218. After adjusting the bounding box, the method 400 advances to block 418, described below. Referring back to block 412, if the portrait composition rule 218 does not match, the method 400 advances to block 416.

In block 416, the imaging device 102 sets the bounding box to include the smallest bounding box containing all subjects of the crop inclusion list and obscures any excluded subjects within the bounding box. The imaging device 102 may obscure excluded subjects by blurring the excluded subjects or by drawing images over the excluded subjects such as black bars, cartoon characters, novelty images, or similar images. In other embodiments, the imaging device 102 may performs any other fallback operation to generate an acceptable sub-image when none of the other composition rules 218 produce an acceptable sub-image.

In block 418, in some embodiments the imaging device 102 may refocus the image to a depth layer corresponding to one or more of the subjects included in the sub-image. For example, a light field camera 140 or similar camera array may be capable of refocusing the image at a particular depth, allowing included subjects to be rendered in sharp relief while rendering other parts of the image as out-of-focus. In some embodiments, the imaging device 102 may algorithmically blur or sharpen portions of the image based on depth information determined by a depth camera 140.

In block 420, the imaging device 102 crops the digital image to generate the sub-image based on the bounding box. The imaging device 102 may render a new image file for the sub-image, or may record the bounding box and other parameters required to render the sub-image. After generating the sub-image for the social network group, the method 400 is completed. The method 400 may be called numerous times for other social network groups.

The illustrative method 400 includes three composition rules 218—the rule of thirds, the portrait rule, and the fallback rule—that are evaluated in a predetermined order of priority. In other embodiments, the imaging device 102 may evaluate additional composition rules 218. For example, the imaging device 102 may evaluate a half-and-half composition rule 218 to generate a sub-image with half of the sub-image dedicated to foreground subjects and half of the sub-image dedicated to background subjects. Additionally or alternatively, in some embodiments the priority or applicability of the composition rules 218 may depend on the social network group of the sub-image and/or the particular subjects of the sub-image. For example, for a social network group based on an affinity for sports, the imaging device 102 may prefer the portrait composition rule 218 for sub-images including a sport image. As another example, for a sub-image including a number of persons in the same social network group (e.g. a group portrait), the imaging device 102 may prefer the portrait composition rule 218.

EXAMPLES

Illustrative examples of the technologies disclosed herein are provided below. An embodiment of the technologies may include any one or more, and any combination of, the examples described below.

Example 1 includes an imaging device for automated image cropping, the imaging device comprising an image capture module to capture a digital image; a subject recognition module to recognize a first subject represented in the digital image; a social network module to determine a first social network group to which the first subject is associated; and an image crop module to crop, based on a content rule policy, the digital image to generate a sub-image including the first subject, the composition rule policy comprising a set of rules that define the composition of the sub-image based on the recognized first subject.

Example 2 includes the subject matter of Example 1, and further including an image sharing module to share the sub-image with the first social network group.

Example 3 includes the subject matter of any of Examples 1 and 2, and wherein to recognize the first subject comprises to detect a position and characteristics of a human face represented in the digital image; detect a position and an identity of an object represented in the digital image; or detect an event represented in the digital image.

Example 4 includes the subject matter of any of Examples 1-3, and wherein to recognize the first subject comprises to recognize an event represented in the digital image based on contextual data received from a contextual sensor of the imaging device.

Example 5 includes the subject matter of any of Examples 1-4, and wherein to recognize the event comprises to recognize an event based on a capture location of the digital image or a capture date of the digital image.

Example 6 includes the subject matter of any of Examples 1-5, and wherein to recognize the first subject comprises to recognize an event represented in the digital image based on contextual data generated by an application of the imaging device.

Example 7 includes the subject matter of any of Examples 1-6, and wherein to recognize the event based on the contextual data comprises to recognize the event based on ticketing data, mobile payment data, or calendar data generated by the application of the imaging device.

Example 8 includes the subject matter of any of Examples 1-7, and wherein the social network module is further to receive social network data from a social network server, the social network data to associate the first subject and the first social network group; wherein to determine the first social network group comprises to determine the first social network group based on the social network data.

Example 9 includes the subject matter of any of Examples 1-8, and wherein the subject recognition module is further to recognize a second subject represented in the digital image; and determine that the second subject is not associated with the first social network group; wherein to crop the digital image further comprises to exclude the second subject from the sub-image.

Example 10 includes the subject matter of any of Examples 1-9, and wherein the social network module is further to determine a second social network group to which the second subject is associated, wherein the first subject is not associated with the second social network group; the image crop module is further to crop, based on a composition rule policy, the digital image to generate a second sub-image including the second subject and excluding the first subject, the composition rule policy comprising a set of rules that define the composition of the second sub-image based on the recognized second subject; and the imaging device further comprises an image sharing module to (i) share the sub-image with the first social network group and (ii) share the second sub-image with the second social network group.

Example 11 includes the subject matter of any of Examples 1-10, and wherein the subject recognition module is further to recognize a second subject represented in the digital image; wherein to crop the digital image further comprises to exclude the second subject from the sub-image as a function of a content policy stored on the imaging device, the content policy comprising a set of rules to define whether to include or to exclude the second subject based on the first social network group.

Example 12 includes the subject matter of any of Examples 1-11, and wherein to recognize the second subject comprises to recognize an object represented in the digital image.

Example 13 includes the subject matter of any of Examples 1-12, and wherein the composition rule policy comprises a rule-of-thirds composition rule policy; and to crop the digital image based on the content rule policy comprises to size the sub-image to position the first subject at a position one-third along a dimension of the sub-image.

Example 14 includes the subject matter of any of Examples 1-13, and wherein the composition rule policy comprises a portrait composition rule policy; and to crop the digital image based on the composition rule policy comprises to size the sub-image to center the first subject in the sub-image.

Example 15 includes the subject matter of any of Examples 1-14, and wherein the subject recognition module is further to recognize a second subject represented in the digital image; and the social network module is further to determine that the second subject is not associated with the first social network group; wherein to crop the digital image based on the composition rule policy comprises to determine whether a rule of thirds composition rule policy generates an acceptable sub-image including the first subject and excluding the second subject; determine whether a portrait composition rule policy generates an acceptable sub-image including the first subject and excluding the second subject; and apply a fallback composition rule policy in response to a determination that the rule of thirds composition rule policy does not generate an acceptable sub-image and a determination that the portrait composition rule policy does not generate an acceptable sub-image, wherein to apply the fallback composition rule policy comprises to crop the digital image to generate the sub-image based on a smallest bounding box containing the first subject; and obscure the second subject in the sub-image.

Example 16 includes the subject matter of any of Examples 1-15, and wherein to obscure the second subject comprises to blur the second subject or to draw an image over the second subject.

Example 17 includes the subject matter of any of Examples 1-16, and further including a depth camera, wherein to capture the digital image comprises to capture depth data associated with the digital image using the depth camera; and to recognize the first subject comprises to recognize the first subject using the depth data associated with the digital image.

Example 18 includes the subject matter of any of Examples 1-17, and wherein to crop the digital image further comprises to re-focus the digital image to focus on the first subject.

Example 19 includes a method for automated image cropping, the method comprising capturing, by an imaging device, a digital image; recognizing, by the imaging device, a first subject represented in the digital image; determining, by the imaging device, a first social network group to which the first subject is associated; and cropping, by the imaging device and based on a content rule policy, the digital image to generate a sub-image including the first subject, the composition rule policy comprising a set of rules that define the composition of the sub-image based on the recognized first subject.

Example 20 includes the subject matter of Example 19, and further including sharing, by the imaging device, the sub-image with the first social network group.

Example 21 includes the subject matter of any of Examples 19 and 20, and wherein recognizing the first subject comprises detecting a position and characteristics of a human face represented in the digital image; detecting a position and an identity of an object represented in the digital image; or detecting an event represented in the digital image.

Example 22 includes the subject matter of any of Examples 19-21, and wherein recognizing the first subject comprises recognizing an event represented in the digital image based on contextual data received from a contextual sensor of the imaging device.

Example 23 includes the subject matter of any of Examples 19-22, and wherein recognizing the event comprises recognizing an event based on a capture location of the digital image or a capture date of the digital image.

Example 24 includes the subject matter of any of Examples 19-23, and wherein recognizing the first subject comprises recognizing an event represented in the digital image based on contextual data generated by an application of the imaging device.

Example 25 includes the subject matter of any of Examples 19-24, and wherein recognizing the event based on the contextual data comprises recognizing the event based on ticketing data, mobile payment data, or calendar data generated by the application of the imaging device.

Example 26 includes the subject matter of any of Examples 19-25, and further including receiving, by the imaging device, social network data from a social network server, the social network data to associate the first subject and the first social network group; wherein determining the first social network group comprises determining the first social network group based on the social network data.

Example 27 includes the subject matter of any of Examples 19-26, and further including recognizing, by the imaging device, a second subject represented in the digital image; and determining, by the imaging device, that the second subject is not associated with the first social network group; wherein cropping the digital image further comprises excluding the second subject from the sub-image.

Example 28 includes the subject matter of any of Examples 19-27, and further including determining, by the imaging device, a second social network group to which the second subject is associated, wherein the first subject is not associated with the second social network group; cropping, by the imaging device and based on a composition rule policy, the digital image to generate a second sub-image including the second subject and excluding the first subject, the composition rule policy comprising a set of rules that define the composition of the second sub-image based on the recognized second subject; sharing, by the imaging device, the sub-image with the first social network group; and sharing, by the imaging device, the second sub-image with the second social network group.

Example 29 includes the subject matter of any of Examples 19-28, and further including recognizing, by the imaging device, a second subject represented in the digital image; wherein cropping the digital image further comprises excluding the second subject from the sub-image as a function of a content policy stored on the imaging device, the content policy comprising a set of rules to define whether to include or to exclude the second subject based on the first social network group.

Example 30 includes the subject matter of any of Examples 19-29, and wherein recognizing the second subject comprises recognizing an object represented in the digital image.

Example 31 includes the subject matter of any of Examples 19-30, and wherein cropping the digital image based on the composition rule policy comprises applying a rule-of-thirds composition rule policy, wherein applying the rule-of-thirds composition rule policy comprises sizing the sub-image to position the first subject at a position one-third along a dimension of the sub-image.

Example 32 includes the subject matter of any of Examples 19-31, and wherein cropping the digital image based on the composition rule policy comprises applying a portrait composition rule, wherein applying the portrait composition rule policy comprises sizing the sub-image to center the first subject in the sub-image.

Example 33 includes the subject matter of any of Examples 19-32, and further including recognizing, by the imaging device, a second subject represented in the digital image; and determining, by the imaging device, that the second subject is not associated with the first social network group; wherein cropping the digital image based on the composition rule policy comprises: determining whether a rule of thirds composition rule policy generates an acceptable sub-image including the first subject and excluding the second subject; determining whether a portrait composition rule policy generates an acceptable sub-image including the first subject and excluding the second subject; and applying a fallback composition rule policy in response to determining that the rule of thirds composition rule policy does not generate an acceptable sub-image and determining that the portrait composition rule policy does not generate an acceptable sub-image, wherein applying the fallback composition rule policy comprises cropping the digital image to generate the sub-image based on a smallest bounding box containing the first subject; and obscuring the second subject in the sub-image.

Example 34 includes the subject matter of any of Examples 19-33, and wherein obscuring the second subject comprises blurring the second subject or drawing an image over the second subject.

Example 35 includes the subject matter of any of Examples 18-34, and wherein capturing the digital image comprises capturing depth data associated with the digital image using a depth camera of the imaging device; and recognizing the first subject comprises recognizing the first subject using the depth data associated with the digital image.

Example 36 includes the subject matter of any of Examples 19-35, and wherein cropping the digital image further comprises re-focusing the digital image to focus on the first subject.

Example 37 includes a computing device comprising a processor; and a memory having stored therein a plurality of instructions that when executed by the processor cause the computing device to perform the method of any of Examples 19-36.

Example 38 includes one or more machine-readable storage media comprising a plurality of instructions stored thereon that in response to being executed result in a computing device performing the method of any of Examples 19-36.

Example 39 includes a computing device comprising means for performing the method of any of Examples 19-36.

The invention claimed is:

1. An imaging device for automated image cropping, the imaging device comprising:
an image capture module to capture a digital image;
a subject recognition module to recognize a first subject and a second subject represented in the digital image;
a social network module to (i) determine a first social network group to which the first subject is associated and (ii) determine a second social network group to which the second subject is associated, wherein the first subject is not associated with the second social network group;
an image crop module to crop, based on a composition rule policy, the digital image to (i) generate a first sub-image including the first subject and excluding the second subject, the composition rule policy comprising a set of rules that define the composition of the first sub-image based on the recognized first subject and (ii) generate a second sub-image including the second subject and excluding the first subject, the composition rule policy comprising a set of rules that define the composition of the second sub-image based on the recognized second subject; and
an image sharing module to (i) share the first sub-image with the first social network group and (ii) share the second sub-image with the second social network group.

2. The imaging device of claim 1, wherein to recognize the first subject comprises to:
detect a position and characteristics of a human face represented in the digital image;
detect a position and an identity of an object represented in the digital image; or
detect an event represented in the digital image.

3. The imaging device of claim 1, wherein to recognize the first subject comprises to recognize an event represented in the digital image based on contextual data received from a contextual sensor of the imaging device.

4. The imaging device of claim 1, wherein to recognize the first subject comprises to recognize an event represented in the digital image based on contextual data generated by an application of the imaging device.

5. The imaging device of claim 1, wherein the social network module is further to receive social network data from a social network server, the social network data to associate the first subject and the first social network group;
wherein to determine the first social network group comprises to determine the first social network group based on the social network data.

6. The imaging device of claim 1,
wherein to crop the digital image further comprises to exclude the second subject from the first sub-image as a function of a content policy stored on the imaging device, the content policy comprising a set of rules to define whether to include or to exclude the second subject based on the first social network group.

7. The imaging device of claim 1,
wherein to crop the digital image based on the composition rule policy comprises to:
determine whether a rule of thirds composition rule policy generates an acceptable first sub-image including the first subject and excluding the second subject;
determine whether a portrait composition rule policy generates an acceptable first sub-image including the first subject and excluding the second subject; and apply a fallback composition rule policy in response to a determination that the rule of thirds composition rule policy does not generate an acceptable first sub-image and a determination that the portrait composition rule policy does not generate an acceptable first sub-image, wherein to apply the fallback composition rule policy comprises to:
crop the digital image to generate the first sub-image based on a smallest bounding box containing the first subject; and
obscure the second subject in the first sub-image.

8. A method for automated image cropping, the method comprising:
capturing, by an imaging device, a digital image;
recognizing, by the imaging device, a first subject and a second subject represented in the digital image;
determining, by the imaging device, a first social network group to which the first subject is associated;
determining, by the imaging device, a second social network group to which the second subject is associated, wherein the first subject is not associated with the second social network group;
cropping, by the imaging device and based on a composition rule policy, the digital image to (i) generate a first sub-image including the first subject, the composition rule policy comprising a set of rules that define the composition of the first sub-image based on the recognized first subject and (ii) generate a second sub-image including the second subject and excluding the first subject, the composition rule policy comprising a set of rules that define the composition of the second sub-image based on the recognized second subject; and
sharing, by the imaging device, the first sub-image with the first social network group and the second sub-image with the second social network group.

9. The method of claim 8, further comprising:
wherein cropping the digital image further comprises excluding the second subject from the first sub-image as a function of a content policy stored on the imaging device, the content policy comprising a set of rules to define whether to include or to exclude the second subject based on the first social network group.

10. The method of claim 8, further comprising:
wherein cropping the digital image based on the composition rule policy comprises:
determining whether a rule of thirds composition rule policy generates an acceptable first sub-image including the first subject and excluding the second subject;
determining whether a portrait composition rule policy generates an acceptable first sub-image including the first subject and excluding the second subject; and
applying a fallback composition rule policy in response to determining that the rule of thirds composition rule policy does not generate an acceptable first sub-image and determining that the portrait composition rule policy does not generate an acceptable first sub-image, wherein applying the fallback composition rule policy comprises:
cropping the digital image to generate the first sub-image based on a smallest bounding box containing the first subject; and
obscuring the second subject in the first sub-image.

11. One or more non-transitory, computer-readable storage media comprising a plurality of instructions that in response to being executed cause an imaging device to:
capture a digital image;
recognize a first subject and a second subject represented in the digital image;
determine a first social network group to which the first subject is associated; and
determine a second social network group to which the second subject is associated, wherein the first subject is not associated with the second social network group;
crop, based on a composition rule policy, the digital image to (i) generate a first sub-image including the first subject, the composition rule policy comprising a set of rules that define the composition of the first sub-image based on the recognized first subject and (ii) generate a second sub-image including the second subject and excluding the first subject, the composition rule policy comprising a set of rules that define the composition of the second sub-image based on the recognized second subject; and
share the first sub-image with the first social network group and the second sub-image with the second social network group.

12. The one or more non-transitory, computer-readable storage media of claim 11, wherein to recognize the first subject comprises to recognize an event represented in the digital image based on contextual data received from a contextual sensor of the imaging device.

13. The one or more non-transitory, computer-readable storage media of claim 11, wherein to recognize the first subject comprises to recognize an event represented in the digital image based on contextual data generated by an application of the imaging device.

14. The one or more non-transitory, computer-readable storage media of claim 11,
wherein to crop the digital image further comprises to exclude the second subject from the first sub-image as a function of a content policy stored on the imaging device, the content policy comprising a set of rules to define whether to include or to exclude the second subject based on the first social network group.

15. The one or more non-transitory, computer-readable storage media of claim 11,
wherein to crop the digital image based on the composition rule policy comprises to:
determine whether a rule of thirds composition rule policy generates an acceptable first sub-image including the first subject and excluding the second subject;
determine whether a portrait composition rule policy generates an acceptable first sub-image including the first subject and excluding the second subject; and
apply a fallback composition rule policy in response to determining that the rule of thirds composition rule policy does not generate an acceptable first sub-image and determining that the portrait composition rule policy does not generate an acceptable first sub-image, wherein to apply the fallback composition rule policy comprises to:
crop the digital image to generate the first sub-image based on a smallest bounding box containing the first subject; and
obscure the second subject in the first sub-image.

* * * * *